US012614717B2

(12) United States Patent
Lee et al.

(10) Patent No.: US 12,614,717 B2
(45) Date of Patent: Apr. 28, 2026

(54) NEGATIVE ELECTRODE ACTIVE MATERIALS, PREPARATION METHODS THEREOF, AND LITHIUM RECHARGEABLE BATTERIES

(71) Applicant: SAMSUNG SDI CO., LTD., Yongin-si (KR)

(72) Inventors: Dae-Hyeok Lee, Yongin-si (KR); Jaehou Nah, Yongin-si (KR); Youngugk Kim, Yongin-si (KR); Yongseok Kim, Yongin-si (KR); Heeyoung Chu, Yongin-si (KR); Sojeong Yu, Yongin-si (KR); Hyejin Kim, Yongin-si (KR); Jaewon Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 222 days.

(21) Appl. No.: 18/384,401

(22) Filed: Oct. 27, 2023

(65) Prior Publication Data

US 2024/0387797 A1 Nov. 21, 2024

(30) Foreign Application Priority Data

May 18, 2023 (KR) ........................ 10-2023-0064524

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0471* (2013.01); *H01M 4/386* (2013.01);
(Continued)

(58) Field of Classification Search
CPC .......... H01M 10/052; H01M 10/0525; H01M 2004/021; H01M 2004/027;
(Continued)

(56) References Cited

U.S. PATENT DOCUMENTS

2017/0170477 A1 6/2017 Sakshaug et al.
2018/0097229 A1 4/2018 Jo et al.
(Continued)

FOREIGN PATENT DOCUMENTS

CN 106129411 A * 11/2016 .......... H01M 4/1393
CN 114142005 A 3/2022
(Continued)

OTHER PUBLICATIONS

Machine translation CN106129411A (Year: 2016).*
(Continued)

*Primary Examiner* — Victoria H Lynch
(74) *Attorney, Agent, or Firm* — Lee IP Law, P.C.

(57) ABSTRACT

A negative electrode active material, including a silicon-carbon composite particle including a plurality of silicon nanoparticles and amorphous carbon, wherein the silicon-carbon composite particle includes closed pores therein, a pore volume of a surface of the silicon-carbon composite particle measured by a BJH method is less than about 0.02 $cm^3/g$, and a volume of the closed pores of the silicon-carbon composite particle calculated by Equation 1 is about 0.015 $cm^3/g$ to about 0.05 $cm^3/g$.

Volume of closed pores in a particle =     [Equation 1]

$((\text{theoretical density}) - (\text{true density}))^{-1}$ −

(pore volume measured by the *BJH* method)

19 Claims, 3 Drawing Sheets

(51) Int. Cl.

| | |
|---|---|
| *H01M 4/38* | (2006.01) |
| *H01M 4/583* | (2010.01) |
| *H01M 10/052* | (2010.01) |
| *H01M 4/02* | (2006.01) |

(52) U.S. Cl.
CPC ......... *H01M 4/583* (2013.01); *H01M 10/052* (2013.01); *H01M 2004/021* (2013.01); *H01M 2004/027* (2013.01)

(58) Field of Classification Search
CPC .. H01M 4/0471; H01M 4/134; H01M 4/1393; H01M 4/1395; H01M 4/364; H01M 4/366; H01M 4/386; H01M 4/583; H01M 4/587; Y02E 60/10
See application file for complete search history.

(56) References Cited

U.S. PATENT DOCUMENTS

| | | | | |
|---|---|---|---|---|
| 2020/0280062 | A1* | 9/2020 | Shin | H01M 4/0471 |
| 2021/0143439 | A1* | 5/2021 | Kim | H01M 4/364 |
| 2021/0408527 | A1 | 12/2021 | Kim et al. | |
| 2023/0143884 | A1 | 5/2023 | Zheng et al. | |
| 2023/0238517 | A1* | 7/2023 | Lee | H01M 4/1395 |
| | | | | 429/231.8 |
| 2024/0290956 | A1* | 8/2024 | Chen | H01M 4/386 |

FOREIGN PATENT DOCUMENTS

| | | | | | |
|---|---|---|---|---|---|
| KR | 10-1494715 | B1 | 2/2015 | | |
| KR | 10-2015-0128432 | A | 11/2015 | | |
| KR | 10-2018-0036456 | A | 4/2018 | | |
| KR | 10-2018-0113187 | A | 10/2018 | | |
| KR | 10-2013821 | B1 | 8/2019 | | |
| KR | 10-2019-0108814 | A | 9/2019 | | |
| KR | 10-2179975 | B1 | 11/2020 | | |
| KR | 10-2021-0013748 | A | 2/2021 | | |
| KR | 20210013748 | A | * 2/2021 | ............ | H01M 4/386 |
| KR | 10-2022-0067594 | A | 5/2022 | | |
| KR | 20220091672 | A | * 7/2022 | ............ | H01M 4/366 |
| KR | 102508088 | B1 | * 3/2023 | ............ | H01M 4/583 |

OTHER PUBLICATIONS

Machine translation KR20210013748A (Year: 2021).*
Machine translation KR20220091672A (Year: 2022).*
Machine translation KR102508088B1 (Year: 2023).*
Barrett, E.P., Joyner, L.G. and Halenda, P.P., The Determination of Pore Volume and Area Distributions in Porous Substances. I. Computations from Nitrogen Isotherms. Journal of the American Chemical Society, 73, 373-380 (1951).
Korean Office action dated Jul. 29, 2025.

* cited by examiner

1

NEGATIVE ELECTRODE ACTIVE MATERIALS, PREPARATION METHODS THEREOF, AND LITHIUM RECHARGEABLE BATTERIES

CROSS-REFERENCE TO RELATED APPLICATION

This application claims priority to and the benefit of Korean Patent Application No. 10-2023-0064524, filed in the Korean Intellectual Property Office on May 18, 2023, the entire contents of which are incorporated herein by reference.

BACKGROUND

1. Field

Embodiments relate to negative electrode active materials, preparation methods thereof, and rechargeable lithium batteries.

2. Description of the Related Art

In recent years, with the rapid spread of electronic devices using batteries such as mobile phones, notebook computers, electric vehicles, etc., the demand for small, lightweight, and relatively high-capacity rechargeable lithium batteries is rapidly increasing. Recently, as high energy density batteries have been required, a high-capacity negative electrode active material is required. The high-capacity negative electrode active material may be a silicon-based compound, but the silicon-based negative electrode active material may significantly expand in its volume according to repeated charges and discharges and thus a severe side reaction with an electrolyte, may resultantly deteriorate the capacity and cycle-life characteristics of the rechargeable lithium batteries.

SUMMARY

Embodiments are directed to a negative electrode active material, including a silicon-carbon composite particle including a plurality of silicon nanoparticles and amorphous carbon, wherein the silicon-carbon composite particle includes closed pores therein, a pore volume of a surface of the silicon-carbon composite particle measured by a BJH method is less than about 0.02 cm³/g, and a volume of the closed pores of the silicon-carbon composite particle calculated by Equation 1 is about 0.015 cm³/g to about 0.05 cm³/g.

$$\text{Volume of closed pores in a particle} = \qquad \text{[Equation 1]}$$
$$\frac{((\text{theoretical density}) - (\text{true density})) - 1 -}{(\text{pore volume measured by the } BJH \text{ method})}$$

In embodiments, the volume of closed pores of the silicon-carbon composite particle calculated by Equation 1 may be about 0.015 cm³/g to about 0.04 cm³/g.

In embodiments, the pore volume of the surface of the silicon-carbon composite particle measured by the BJH method may be about 0.001 cm³/g to about 0.018 cm³/g.

2

In embodiments, an average particle diameter ($D_{50}$) of the silicon-carbon composite particle may be about 3 μm to about 25 μm.

In embodiments, the plurality of silicon nanoparticles may be included in an amount of about 56 wt % to about 64 wt % and the amorphous carbon may be included in an amount of about 36 wt % to about 44 wt % based on a total weight of the silicon-carbon composite particle.

In embodiments, the plurality silicon nanoparticles may be included in an amount of about 58 wt % to about 63 wt % and the amorphous carbon may be included in an amount of about 37 wt % to about 42 wt % based on a total weight of the silicon-carbon composite particle.

In embodiments, the silicon-carbon composite particle may include an amorphous carbon matrix and the plurality of silicon nanoparticles may be embedded in the amorphous carbon matrix.

In embodiments, the silicon-carbon composite particle may include the amorphous carbon surrounding the surface of the plurality of silicon nanoparticles.

In embodiments, an average particle diameter ($D_{50}$) of the plurality of silicon nanoparticles may be about 10 nm to about 200 nm and a maximum particle diameter ($D_{max}$) may be less than or equal to about 300 nm.

In embodiments, the plurality of silicon nanoparticles may have a full width at half maximum (FWHM) of a (111) plane peak measured by X-ray diffraction method of about 0.5 to about 7.

In embodiments, a silicon nanoparticle may have a flake-shape.

In embodiments, a ratio of a length of a major axis in a plane direction to a thickness of a flake-shaped silicon nanoparticles may be about 5 to about 20.

In embodiments, the amorphous carbon may include a pitch or pitch carbonized product.

Embodiments are directed towards a method for preparing a negative electrode active material, the method including preparing a silicon precursor by spray-drying a slurry in which a plurality of silicon nanoparticles are dispersed in a solvent, first mixing pitch with the silicon precursor and performing first heat-treatment, second mixing pitch with an obtained product and performing second heat-treatment, and third mixing pitch with an obtained product and performing third heat-treatment, the silicon precursor being mixed in an amount of about 56 wt % to about 64 wt % and the pitch being mixed in an amount of about 36 wt % to about 44 wt % based on a total weight of the silicon precursor and pitch.

In embodiments, in the first mixing and heat-treatment, the pitch may be mixed in an amount of about 30 wt % to about 38 wt % based on a total weight of the silicon precursor and pitch, in the second mixing and heat-treatment, the pitch may be mixed in an amount of about 1 wt % to about 10 wt % based on a total weight of the silicon precursor and pitch, and in the third mixing and heat-treatment, the pitch may be mixed in an amount of about 1 wt % to about 10 wt % based on a total weight of the silicon precursor and pitch.

In embodiments, in the first to third mixing and heat-treatment, heat-treatment temperature may each be about 800° C. to about 1100° C.

In embodiments, the method may further include a fourth or higher mixing and heat-treatment process after the third mixing and heat-treatment.

In embodiments, in the fourth or higher mixing and heat-treatment processes, the pitch may be mixed in an amount of about 1 wt % to about 10 wt % based on a total weight of the silicon precursor and pitch and a heat-treatment temperature may be about 800° C. to about 1100° C.

In embodiments, the method may further include pulverizing after the first mixing and heat-treatment, the second mixing and heat-treatment, or the third or higher mixing and heat-treatment.

Embodiments are directed to a rechargeable lithium battery, including a negative electrode including the negative electrode active material, a positive electrode, and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
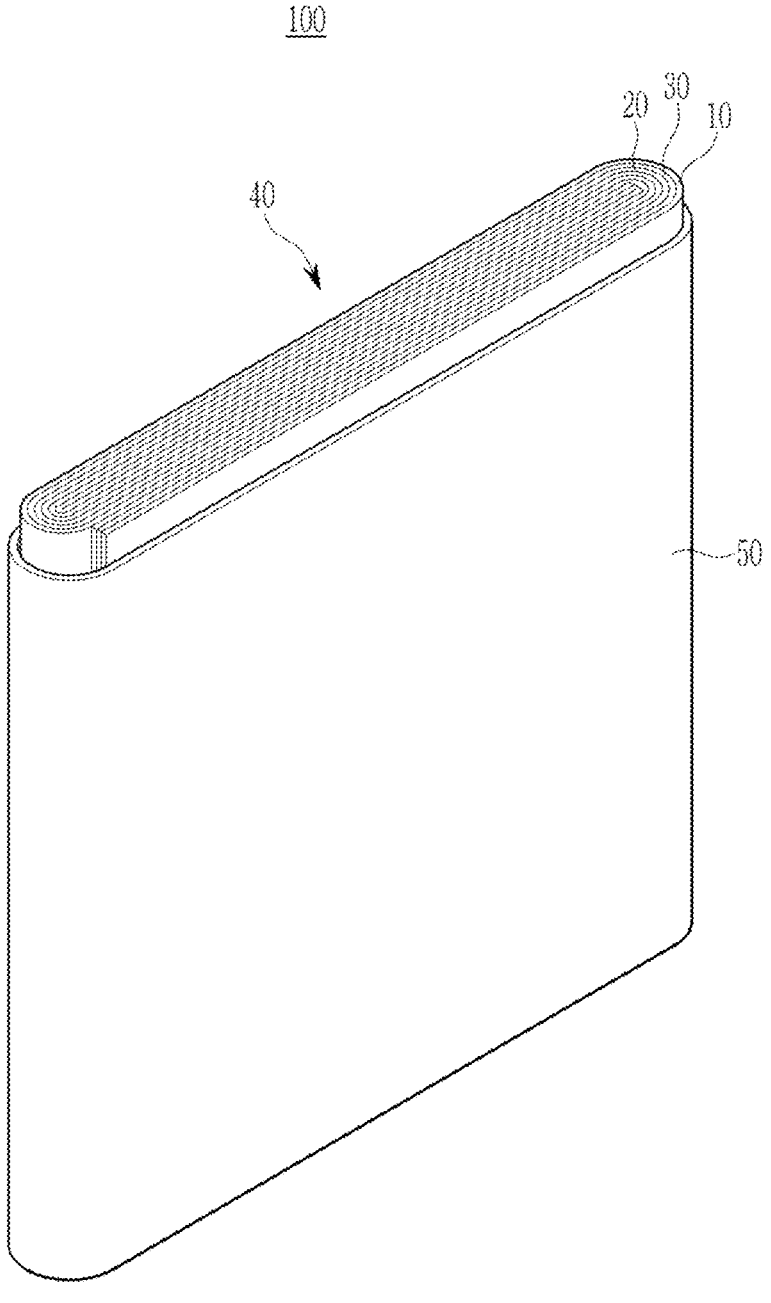
FIG. 1 shows a schematic, perspective view of a rechargeable lithium battery according to embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The terminology used herein is used to describe particular embodiments only and should not be construed as limiting the scope of all embodiments. The singular expression includes the plural expression unless the context clearly dictates otherwise.

As used herein, "combination thereof" means a mixture, laminate, composite, copolymer, alloy, blend, reaction product, and the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, "layer" herein includes not only a shape formed on the whole surface when viewed from a plan view, but also a shape formed on a partial surface.

In addition, the average particle diameter may be measured by a method well known to those skilled in the art, for example, may be measured by a particle size analyzer, or may be measured by a transmission electron microscopic image or a scanning electron microscopic image. Alternatively, it is possible to obtain an average particle diameter value by measuring it using a dynamic light scattering method, performing data analysis, counting the number of particles for each particle size range, and calculating from this. As used herein, when a definition is not otherwise provided, average particle diameter may mean the diameter ($D_{50}$) of particles having a cumulative volume of 50 volume % in the particle size distribution. As used herein, when a definition is not otherwise provided, the average particle diameter means a diameter ($D_{50}$) of particles having a cumulative volume of 50 volume % in the particle size distribution that is obtained by measuring the size (diameter or length of the major axis) of about 20 particles randomly in an optical micrograph.

Herein, "or" is not to be construed as an exclusive meaning, for example, "A or B" is construed to include A, B, A+B, and the like.

"Metal" is interpreted as a concept including ordinary metals, transition metals and metalloids (semi-metals).

Negative Electrode Active Material

A silicon-based negative electrode active material has high theoretical capacity but may have limitations in practical application to batteries due to a volume expansion rate of about 300% and a severe side reaction with an electrolyte according to charges and discharges. Accordingly, many studies on combining silicon with other materials have been conducted, proposing many composite materials of the silicon and a carbon material. Conventional silicon-carbon composites, where pores are minimized to increase cycle-life characteristics, have a problem of large volume expansion according to charges and discharges, but if a plenty of the pores are formed to solve the volume expansion problem, the side reaction with an electrolyte is accelerated, deteriorating a cycle-life.

In some example embodiments, proposed is a negative electrode active material that alleviates volume expansion while minimizing side reactions with an electrolyte by forming closed pores of a certain volume inside the particle while minimizing pores on the surface of the particle in a composite of silicon and carbon to improved cycle-life characteristics.

A negative electrode active material according to some example embodiments may include a silicon-carbon composite particle including a plurality of silicon nanoparticles and amorphous carbon, wherein the silicon-carbon composite particle may include closed pores therein. The silicon-carbon composite particle may have a pore volume of the surface of the silicon-carbon composite particle measured by the BJH method of less than about 0.02 cm$^3$/g, and a volume of closed pores of the silicon-carbon composite particle calculated by Equation 1 of about 0.015 cm$^3$/g to about 0.05 cm$^3$/g.

$$\text{Volume of closed pores in a particle} = \qquad \text{[Equation 1]}$$
$$((\text{theoretical density}) - (\text{true density}))^{-1} -$$
$$(\text{pore volume measured by the } BJH \text{ method})$$

The closed pore refers to an independent pore that is not connected to other pores or the outside because all walls of the pore are formed in a closed structure. The closed pores inside the silicon-carbon composite particle may serve as a type of buffer space, and may minimize volume expansion occurring while the silicon-carbon composite particle stores lithium. In addition, since the closed pores may be difficult to contact with the electrolyte, penetration of the electrolyte into the inside of the silicon-carbon composite particle may be minimized, so that deterioration of the negative electrode active material by the electrolyte may be suppressed and cycle-life characteristics may be improved.

Unlike closed pores, open pores may have a structure in which some of the walls of the pores are not closed, and they are pores connected to the outside and may serve as passages for materials to flow in and out and may serve as spaces for electrolytes to penetrate. A volume of open pores included in the silicon-carbon composite particle may be measured by the Barrett, Joyner and Halenda (BJH) method, which is a method derived through adsorption or desorption of nitrogen. The BJH method is an analysis method based on the Kelvin equation, which is a relational expression between the pore diameter that causes capillary condensation and the relative pressure of nitrogen, assuming that the shape of the pores is cylindrical, which can be measured according to DIN 66134. The volume of open pores using the BJH method can be measured using equipment such as Micromeritics' ASAP 2460. In addition, the size of pores of the silicon-carbon composite particle measured by the BJH method may be about 2 nm to about 200 nm.

The silicon-carbon composite particle according to some example embodiments may have a pore volume measured by the BJH method of less than about 0.02 $cm^3/g$, e.g., about 0.001 $cm^3/g$ to about 0.019 $cm^3/g$, about 0.001 $cm^3/g$ to about 0.018 $cm^3/g$, or about 0.005 $cm^3/g$ to about 0.015 $cm^3/g$. The pore volume measured by the BJH method can be referred to as a volume of open pores on the surface of the silicon-carbon composite particle. If the pore volume of the silicon-carbon composite particle, measured by the BJH method, satisfies the above range, electrolyte penetration into the composite particle may be minimized, thereby suppressing side reactions and improving cycle-life characteristics.

The volume of closed pores inside the silicon-carbon composite particle according to some example embodiments can be obtained through Equation 1. In Equation 1, the theoretical density of the silicon-carbon composite particle may be obtained through known density values of silicon and carbon. The true density of the silicon-carbon composite particle can be measured using a true density measuring instrument, and can be obtained by, e.g., measuring a volume of a material contained in a specific container using helium gas and dividing a weight by the volume. In Equation 1, the pore volume measured by the BJH method means the volume of open pores on the surface of the silicon-carbon composite particle measured by the BJH method.

According to some example embodiments, the volume of closed pores of the silicon-carbon composite particle calculated through Equation 1 may be about 0.015 $cm^3/g$ to about 0.05 $cm^3/g$, e.g., about 0.015 $cm^3/g$ to about 0.04 $cm^3/g$, about 0.015 $cm^3/g$ to about 0.03 $cm^3/g$, about 0.015 $cm^3/g$ to about 0.025 $cm^3/g$, or about 0.016 $cm^3/g$ to about 0.020 $cm^3/g$. When the volume of the closed pores satisfies the above range, the problem of volume expansion due to lithium storage may be effectively alleviated while minimizing capacity degradation, and cycle-life may be improved by minimizing deterioration caused by the electrolyte.

The shape of the silicon-carbon composite particle may be, e.g., spherical, elliptical, polyhedral, or irregular.

The average particle diameter ($D_{50}$) of the silicon-carbon composite particle may be about 3 μm to about 25 μm, e.g., about 5 μm to about 20 μm, or about 6 μm to about 18 μm. If the average particle diameter satisfies the above range, it may be advantageous in realizing high capacity and high energy density. The average particle diameter means a diameter ($D_{50}$) of particles having a cumulative volume of 50 volume % in the particle size distribution that is obtained by measuring the size (diameter or length of the major axis) of about 20 particles randomly in an optical micrograph.

The amorphous carbon may be included in an amount of about 36 wt % to about 44 wt %, e.g., about 37 wt % to about 43 wt %, about 38 wt % to about 42 wt %, or about 38 wt % to about 41 wt % based on 100 wt % of the silicon-carbon composite particles. In addition, the silicon nanoparticles may be included in an amount of about 56 wt % to about 64 wt %, e.g., about 57 wt % to about 63 wt %, about 58 wt % to about 62 wt %, or about 59 wt % to about 62 wt % based on 100 wt % of the silicon-carbon composite particles. If the contents of amorphous carbon and silicon nanoparticles satisfies the above ranges, volume expansion due to charging and discharging may be effectively alleviated while realizing high capacity.

In some example embodiments, the silicon-carbon composite particle may include an amorphous carbon matrix and a plurality of silicon nanoparticles embedded in the amorphous carbon matrix. In other words, the silicon-carbon composite particle may include a plurality of silicon nanoparticles and amorphous carbon surrounding the surface of the silicon nanoparticles.

Figure 2:
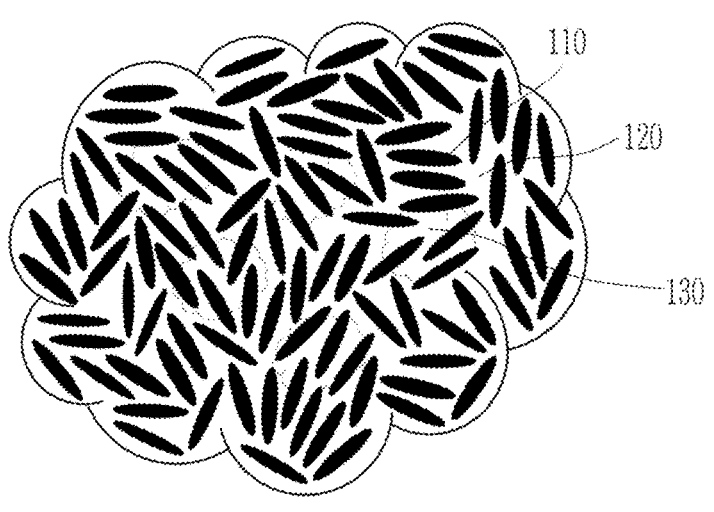
FIG. 2 is a schematic diagram showing a cross-section of a silicon-carbon composite particle according to embodiments.

For better understanding, a schematic diagram of a cross-section of a silicon-carbon composite particle according to some example embodiments is shown in FIG. 2. Referring to FIG. 2, a plurality of silicon nanoparticles 110 may be embedded or dispersed in amorphous carbon 120, which is a type of matrix, or the surface of the plurality of silicon nanoparticles 110 may be surrounded by the amorphous carbon 120. One or a plurality of closed pores 130 may be formed inside the silicon-carbon composite particles.

An average particle diameter ($D_{50}$) of the silicon nanoparticles 110 may be about 10 nm to about 200 nm, e.g., about 20 nm to about 150 nm, or about 30 nm to about 120 nm. In addition, the maximum particle diameter ($D_{max}$) of the silicon nanoparticles 110 may be less than or equal to about 300 nm, e.g., less than or equal to about 280 nm, or less than or equal to about 250 nm. If the average particle diameter and the maximum particle diameter of the silicon nanoparticles 110 are within the above ranges, silicon-carbon composite particles of good shape may be produced, and it may be advantageous in suppressing volume expansion due to charging and discharging, and also during charging and discharging, disconnection of conductive paths by crushing of the composite particles can be prevented. The average particle diameter and the maximum particle diameter may be obtained by measuring the size (diameter or major axis length) of about 20 silicon particles randomly in an electron microscope image of a cross-section of the silicon-carbon composite particle to obtain a particle size distribution, and taking the average particle diameter ($D_{50}$) of particles having a cumulative volume of 50% by volume in the particle size distribution as the average particle diameter, and also taking the maximum particle size value as the maximum particle diameter ($D_{max}$).

The silicon nanoparticles 110 may have, e.g., a full width at half maximum (FWHM) of a (111) plane peak measured by X-ray diffraction method of about 0.5 to about 7. In this case, the silicon nanoparticles 110 may be said to be suitable for realizing high capacity as a negative electrode active material. The X-ray diffraction may be analyzed, e.g., under the following conditions.

X-ray wavelength: 1.541838 Å (CuKα)

Slit conditions: Divergence Silt, Scattering Slit 0.5°, Receiving Slit 0.15 mm

Scan conditions: 0.02 step, 1°/min

The silicon nanoparticle 110 may have, e.g., a spherical, elliptical, flake, nanowire, nanorod, or nanofiber shape. In an implementation, the silicon nanoparticles 110 may be in the form of flakes. In this case, a ratio of the length of the major axis in the plane direction to a thickness of the flake-shaped silicon nanoparticles may be about 5 to about 20. If these ratios are satisfied, the silicon nanoparticles 110 may be evenly dispersed in the silicon-carbon composite particle to realize high capacity and minimize volume expansion, and even if the composite particles are damaged, disconnection of the conductive path may be suppressed, which may be desirable for electrochemical properties of a battery. The ratio of the length of the major axis in the plane direction to the thickness may be measured from an electron microscope image of a cross-section of the silicon-carbon composite particle.

The type or form of the amorphous carbon 120 may include, e.g., pitch or pitch carbonized product, and in this case, it may be advantageous to form closed pores inside the silicon-carbon composite particles.

Method for Preparing Negative Electrode Active Material

In some example embodiments, a method for preparing a negative electrode active material may include preparing a silicon precursor by spray-drying a slurry in which a plurality of silicon nanoparticles may be dispersed in a solvent, first mixing pitch with the silicon precursor and performing a first heat-treatment, second mixing pitch with the obtained product and performing a second heat-treatment, and third mixing pitch with the obtained product and performing a third heat-treatment. At this time, the silicon precursor may be mixed in an amount of about 56 wt % to about 64 wt % and the pitch may be mixed in an amount of about 36 wt % to about 44 wt % based on 100 wt % of a total weight of the silicon precursor and pitch. Herein, the content of the pitch means the sum of all the pitches entering the entire process, such as the 1st to 3rd processes. A fourth or higher mixing and heat-treatment process may be further included after the third mixing and heat-treatment. Through this method, the aforementioned negative electrode active material may be prepared.

The pitch may be referred to as a precursor of amorphous carbon constituting silicon-carbon composite particles. The pitch may be, e.g., coal-based pitch, mesophase pitch, petroleum-based pitch, synthetic pitch, or a combination thereof. According to an embodiment, if the silicon precursor is mixed with pitch and then, heat-treated, wherein the pitch is used in a constant content but divided into three or more sub-contents so that the pitch may be several times added to the silicon precursor, closed pores of an appropriate volume may be formed in the silicon-carbon composite particles, but open pores may be minimized on the surface of the composite particles. On the contrary, if the pitch is added once to the silicon precursor or added in an inappropriate content thereto, composite particles with this structure may be difficult to prepare.

The average particle diameter and shape of the silicon nanoparticles as raw materials may be the same as those described above. The solvent used in preparing the silicon precursor may be a solvent that volatilizes easily without deteriorating the silicon nanoparticles, and may be, e.g., an alcohol-based solvent. In an implementation, the solvent may include isopropyl alcohol, ethanol, methanol, butanol, propylene glycol, water, or a combination thereof.

The mixing ratio of the silicon nanoparticles and the solvent may be about 5:95 to about 30:70 by weight, e.g., about 10:90 to about 25:75. When the mixing ratio of the silicon nanoparticles and the solvent satisfies the above range, milling efficiency may be maximized.

The slurry may further include an additive such as a dispersant in addition to the silicon nanoparticles and the solvent.

The spray drying process may be carried out at a temperature range of, e.g., about 50° C. to about 200° C., or about 120° C. to about 170° C. The silicon precursor may be prepared through spray drying, and the silicon precursor may be, e.g., in the form of secondary particles in which a plurality of silicon primary nanoparticles may be assembled, and may be, e.g., porous silicon secondary particles.

In the first mixing and heat-treatment, the pitch may be mixed in an amount of about 30 wt % to about 38 wt %, e.g., about 31 wt % to about 38 wt %, about 32 wt % to about 36 wt % based on 100 wt % of the total weight of the silicon precursor and pitch. In the second or third or higher mixing and heat-treatment, the pitch may be mixed in an amount of about 1 wt % to about 10 wt %, e.g., about 1 wt % to about 8 wt %, or about 2 wt % to about 5 wt % based on 100 wt % of the total weight of the silicon precursor and pitch. By appropriately adjusting the pitch addition amount in each step, it may be possible to minimize surface pores while forming closed pores of an appropriate volume in the silicon-carbon composite particles.

The heat-treatment temperature in the first to third and fourth or higher mixing and heat-treatment processes may be about 800° C. to about 1100° C., e.g., about 850° C. to about 1050° C., or about 900° C. to about 1000° C. respectively. In addition, the heat-treatment may be performed in a nitrogen atmosphere or an argon atmosphere, and may be performed for about 1 hour to about 6 hours, or about 1 hour to about 4 hours.

The method preparing a negative electrode active material to some example embodiments may further include pulverizing the product after the first mixing and heat-treatment, the second mixing and heat-treatment, or the third or higher mixing and heat-treatment.

The method of preparing the negative electrode active material may include, in an implementation, 3 to 10 times, e.g., 3 to 8 times, 3 to 6 times, or 3 to 5 times of pitch mixing and heat-treatment.

Rechargeable Lithium Battery

In some example embodiments, a rechargeable lithium battery may include a negative electrode including the aforementioned negative electrode active material, a positive electrode, and an electrolyte. The rechargeable lithium battery may be classified into cylindrical, prismatic, pouch, coin, and the like depending on their shape. FIG. 1 is a schematic, perspective view showing a rechargeable lithium battery according to some example embodiments. Referring to FIG. 1, the rechargeable lithium battery 100 may include an electrode assembly 40 including a separator 30 between a positive electrode 10 and a negative electrode 20, and a case 50 in which the electrode assembly 40 is housed. The positive electrode 10, the negative electrode 20, and the separator 30 may be impregnated with an electrolyte solution.

Negative Electrode

The negative electrode may include a current collector and a negative electrode active material layer on the current collector. The negative electrode active material layer may include the aforementioned negative electrode active material, and may further include other negative electrode active materials, a binder, and/or a conductive material.

The negative electrode active materials that may be further included in addition to the aforementioned negative electrode active materials may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, e.g., crystalline carbon, amorphous carbon, or a combination thereof as a carbon-based negative electrode active material. The crystalline carbon may be natural graphite, artificial graphite, or combinations thereof, which may have an irregular, plate-like, scaly, flake-like, spherical, or fibrous shape. In an implementation the amorphous carbon may include soft carbon, hard carbon, mesophase pitch carbonized product, fired coke, carbon black, acetylene black, ketjen black, and the like.

The lithium metal alloy may be an alloy of lithium and a metal selected from lithium and, e.g., Na, K, Rb, Cs, Fr, Be, Mg, Ca, Sr, Si, Sb, Pb, In, Zn, Ba, Ra, Ge, Al or Sn.

The material capable of doping/dedoping lithium may be a Si-based negative electrode active material or a Sn-based negative electrode active material. The Si-based negative electrode active material may include silicon, a silicon-carbon composite, $SiO_x$ $(0<x<2)$, a Si-Q alloy (wherein Q may be an element, e.g., alkali metal, an alkaline-earth metal, a Group 13 element, a Group 14 element (excluding Si), a Group 15 element, a Group 16 element, a transition metal, a rare earth element, or a combination thereof, and may be, e.g., Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof), or a combination thereof. The Sn-based negative electrode active material may be Sn, $SnO_2$, Sn alloy, or a combination thereof.

Binder

The binder may serve to well adhere the negative electrode active material particles to each other and also to adhere the negative electrode active material to the current collector. The binder may be a non-aqueous binder, an aqueous binder, a dry binder, or a combination thereof.

The non-aqueous binder may be polyvinylchloride, carboxylated polyvinylchloride, polyvinylfluoride, ethylene propylene copolymer, polystyrene, polyurethane, polytetrafluoroethylene, polyvinylidene fluoride, polyethylene, polypropylene, polyamideimide, polyimide, or a combination thereof.

The aqueous binder may be a styrene-butadiene rubber, a (meth)acrylated styrene-butadiene rubber, a (meth)acrylonitrile-butadiene rubber, a (meth)acrylic rubber, a butyl rubber, a fluorine rubber, polyethyleneoxide, polyvinylpyrrolidone, polyepichlorohydrine, polyphosphazene, poly(meth)acrylonitrile, an ethylene propylene diene copolymer, polyvinylpyridine, chlorosulfonated polyethylene, latex, a polyester resin, (meth)acrylic resin, a phenol resin, an epoxy resin, polyvinyl alcohol, or a combination thereof.

If the aqueous binder is used as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and used. The alkali metal may be Na, K, or Li.

The dry binder may be a polymer material capable of being fibrous, and may be, e.g., polytetrafluoroethylene, polyvinylidene fluoride, polyvinylidene fluoride-hexafluoropropylene copolymer, polyethylene oxide, or a combination thereof.

Conductive Material

The conductive material may be used to impart conductivity to the electrode, and any electrically conductive material may be used as a conductive material unless it causes a chemical change in a battery. Examples of the conductive material may include a carbon-based material such as natural graphite, artificial graphite, carbon black, acetylene black, ketjen black, carbon fiber, carbon nanofibers, carbon nanotubes, and the like; a metal-based material including copper, nickel, aluminum, silver, etc., in the form of metal powders or metal fibers; a conductive polymer such as a polyphenylene derivative; or a mixture thereof.

Each content of the binder and the conductive material may be about 0.5 wt % to about 5 wt % based on 100 wt % of the negative electrode active material layer.

Current Collector

The negative electrode current collector may include, e.g., indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof, and may be in the form of a foil, sheet, or foam. The negative electrode current collector may have, e.g., a thickness of about 1 μm to about 20 μm, about 5 μm to about 15 μm, or about 7 μm to about 10 μm.

Positive Electrode

In some example embodiments, the positive electrode may include a current collector and a positive electrode active material layer on the current collector, and the positive electrode active material layer may include a positive electrode active material and may optionally include a binder and/or a conductive material.

Positive Electrode Active Material

The positive electrode active material may include a compound (lithiated intercalation compound) capable of intercalating and deintercalating lithium. In an implementation, at least one of a composite oxide of lithium and a metal selected from cobalt, manganese, nickel, and combinations thereof may be used.

The composite oxide may be a lithium transition metal composite oxide, and, in an implementation, may include lithium nickel-based oxide, lithium cobalt-based oxide, lithium manganese-based oxide, lithium iron phosphate-based compound, cobalt-free nickel-manganese-based oxide, and overlithiated layered oxide, or a combination thereof.

In an implementation, the positive electrode active material may be a high-nickel positive electrode active material having a nickel content of greater than or equal to about 80 mol % based on 100 mol % of a metal excluding lithium in the lithium transition metal composite oxide. A nickel content in the high-nickel positive electrode active material may be greater than or equal to about 85 mol %, greater than or equal to about 90 mol %, greater than or equal to about 91 mol %, or greater than or equal to about 94 mol % and less than or equal to about 99 mol % based on 100 mol % of the metal excluding lithium. The high-nickel positive electrode active material may realize high capacity and may be applied to high-capacity, high-density rechargeable lithium batteries.

In an implementation, a compound represented by any one of the following chemical formulas may be used.
$Li_aA_{1-b}X_bO_{2-c}D_c$ $(0.90 \le a \le 1.8, \quad 0 \le b \le 0.5, \quad 0 \le c \le 0.05)$;
$Li_aMn_{2-b}X_bO_{4-c}D_c$ $(0.90 \le a \le 1.8, \quad 0 \le b \le 0.5, \quad 0 \le c \le 0.05)$;

11

$Li_aN_{1-b-c}Co_bX_cO_{2-\alpha}D_\alpha$ ($0.90 \leq a \leq 1.8$, $0 \leq b \leq 0.5$, $0 \leq c \leq 0.5$, $0 < \alpha < 2$); $Li_aNi_{1-b-c}Mn_bX_cO_{2-\alpha}D_\alpha$ ($0.90 \leq a \leq 1.8$, $0 \leq b \leq 0.5$, $0 \leq c \leq 0.5$, $0 < \alpha < 2$);

$$Li_aNi_bCo_cL_d^1G_eO_2$$

($0.90 \leq a \leq 1.8$, $0 \leq b \leq 0.9$, $0 \leq c \leq 0.5$, $0 \leq d \leq 0.5$, $0 \leq e \leq 0.1$); $Li_aN$-$iG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $Li_{(3-f)}Fe_2(PO_4)_3$ ($0 \leq f \leq 2$); and $Li_aFePO_4$ ($0.90 \leq a \leq 1.8$)

In the above chemical formulas, A may be Ni, Co, Mn, or a combination thereof; X may be Al, Ni, Co, Mn, Cr, Fe, Mg, Sr, V, a rare earth element or a combination thereof; D may be O, F, S, P, or a combination thereof; G may be Al, Cr, Mn, Fe, Mg, La, Ce, Sr, V, or a combination thereof; Q may be Ti, Mo, Mn, or a combination thereof; Z may be Cr, V, Fe, Sc, Y, or a combination thereof; and $L^1$ may be Mn, Al or a combination thereof.

Binder

The binder may serve to well attach the positive electrode active material particles to each other and also to well attach the positive electrode active material to the current collector. The binder may include polyvinylalcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, a (meth)acrylated styrene-butadiene rubber, an epoxy resin, a (meth)acrylic resin, a polyester resin, nylon, or the like.

Conductive Material

The conductive material may be used to impart conductivity to the electrode, and any electrically conductive material may be used as a conductive material unless it causes a chemical change in a battery. In an implementation, the conductive material may include a carbon-based material such as natural graphite, artificial graphite, carbon black, acetylene black, ketjen black, carbon fiber, carbon nanofibers, carbon nanotubes, and the like; a metal-based material including copper, nickel, aluminum, silver, etc., in the form of metal powders or metal fibers; a conductive polymer such as a polyphenylene derivative; or a mixture thereof.

Each content of the binder and the conductive material may be about 0.5 wt % to about 5 wt % based on 100 wt % of the positive electrode active material layer.

Al may be used as the positive electrode current collector.

Electrolyte

An electrolyte for a rechargeable lithium battery may be, e.g., an electrolyte solution, which may include a non-aqueous organic solvent and a lithium salt.

The non-aqueous organic solvent may serve as a medium for transmitting ions taking part in the electrochemical reaction of a battery. The non-aqueous organic solvent may include a carbonate-based, ester-based, ether-based, ketone-based, or alcohol-based solvent, an aprotic solvent, or a combination thereof.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, decanolide, mevalonolactone, valerolactone, caprolactone, or the like. The ether-based solvent may include dibutyl ether, tetraglyme, diglyme, dimethoxyethane, 2-methyltetrahydrofuran, 2,5-dimethyltetrahydrofuran, tetrahydrofuran, or the like. The ketone-based solvent may include cyclohexanone or the like. The alcohol-based solvent may include ethanol, isopropyl alcohol, or the like and the aprotic solvent may include nitriles such as R-CN (wherein R may include a C2 to C20 linear, branched, or cyclic hydrocarbon group, a double bond, an aromatic ring, or an ether bond); amides such as dimethylformamide; dioxolanes such as 1,3-dioxolane, 1,4-dioxolane, or the like; sulfolanes, or the like.

The non-aqueous organic solvent may be used alone or in combination of two or more, and a mixing ratio may be appropriately adjusted according to the desired battery performance, which is well understood by those skilled in the art.

In the case of using a carbonate-based solvent, a mixture of cyclic carbonate and chain carbonate may be used, and the cyclic carbonate and chain carbonate may be mixed in a volume ratio of about 1:1 to about 1:9.

The non-aqueous organic solvent may further include an aromatic hydrocarbon-based organic solvent. In an implementation, a carbonate-based solvent and an aromatic hydrocarbon-based organic solvent may be mixed and used in a volume ratio of about 1:1 to about 30:1.

The electrolyte solution may further include vinylethyl carbonate, vinylene carbonate, or ethylene carbonate-based compounds in order to improve battery cycle-life.

In an implementation, the ethylene carbonate-based compound may include fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, or the like.

The lithium salt may be dissolved in an organic solvent, may supply a battery with lithium ions, may basically operate the rechargeable lithium battery, and may improve transportation of the lithium ions between positive and negative electrodes. In an implementation, the lithium salt may include, e.g., $LiPF_6$, $LiBF_4$, $LiSbF_6$, $LiAsF_6$, $LiClO_4$, $LiAlO_2$, $LiAlCl_4$, $LIPO_2F_2$, $LiCl$, $LiI$, $LiN(SO_3C_2F_5)_2$, $Li(FSO_2)_2N$ (lithium bis(fluorosulfonyl)imide; LiFSI), $LiC_4F_9SO_3$, $LiN(C_xF_{2x+1}SO_2)(C_yF_{2y+1}SO_2)$, where x and y may be an integer of 1 to 20, lithium trifluoromethane sulfonate, lithium tetrafluoroethane sulfonate, lithium difluorobis(oxalato)phosphate (LiDFOB), and lithium bis(oxalato) borate (LiBOB).

A concentration of the lithium salt may be within the range of about 0.1 M to about 2.0M. If the concentration of the lithium salt is within the above range, the electrolyte solution may have appropriate ionic conductivity and viscosity, and thus excellent performance may be exhibited, and lithium ions may move effectively.

Separator

Depending on the type of rechargeable lithium battery, a separator may be present between the positive electrode and the negative electrode. In an implementation, a suitable separator material may include polyethylene, polypropylene, polyvinylidene fluoride, or multi-layers thereof such as a polyethylene/polypropylene double-layered separator, a polyethylene/polypropylene/polyethylene triple-layered separator, or a polypropylene/polyethylene/polypropylene triple-layered separator.

The separator may include a porous substrate and a coating layer including an organic material, an inorganic material, or a combination thereof positioned on one or both surfaces of the porous substrate.

The porous substrate may be a polymer film formed of any one polymer, e.g., a polyolefin such as polyethylene and polypropylene, polyester such as polyethylene terephthalate and polybutylene terephthalate, polyacetal, polyamide, polyimide, polycarbonate, polyether ketone, polyaryl ether ketone, polyetherimide, polyamideimide, polybenzimidazole, polyethersulfone, polyphenylene oxide, a cyclic olefin copolymer, polyphenylene sulfide, polyethylene naphthalate, a glass fiber, TEFLON (tetrafluoroethylene), and polytetrafluoroethylene, or a copolymer or mixture of two or more of them.

The porous substrate may have a thickness of about 1 μm to about 40 μm, e.g., about 1 μm to about 30 μm, about 1 μm to about 20 μm, about 5 μm to about 15 μm, or about 10 μm to about 15 μm.

The organic material may include a (meth)acrylic copolymer including a first structural unit derived from (meth)acrylamide; and a second structural unit including at least one of a structural unit derived from (meth)acrylic acid or (meth)acrylate and a structural unit derived from (meth)acrylamidosulfonic acid or a salt thereof.

The inorganic material may include inorganic particles, e.g., $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, boehmite, or a combination thereof. An average particle diameter ($D_{50}$) of the inorganic particles may be about 1 nm to about 2000 nm, e.g., about 100 nm to about 1000 nm, or about 100 nm to about 700 nm.

The organic material and the inorganic material may be mixed in one coating layer, or a coating layer including an organic material and a coating layer including an inorganic material may be stacked.

Each of the coating layers may have a thickness of about 0.5 μm to about 20 μm, e.g., about 1 μm to about 10 μm, or about 1 μm to about 5 μm.

Examples and Comparative examples are described below, but it will be understood that the Examples and Comparative Examples are not to be construed as limiting the scope of the embodiments, nor are the Comparative Examples to be construed as being outside the scope of the embodiments.

Comparative Example 1

1. Preparation of Negative Electrode Active Material

Silicon nanoparticles having an average particle diameter ($D_{50}$) of about 90 nm and a maximum particle diameter ($D_{max}$) of about 150 nm and stearic acid were added to an isopropyl alcohol solvent and then, mixed with a ball mill, preparing slurry in which the silicon nanoparticles were dispersed. This slurry was spray-dried with a spray dryer within a temperature range of 120° C. to 170° C., preparing a silicon precursor. 65 wt % of the silicon precursor was mixed with 29 wt % of pitch and then, primarily heat-treated at 950° C. under a nitrogen atmosphere for 2 hours and pulverized by using a jet mill, 3 wt % of the pitch was further added to 100 wt % of the mixture of the silicon precursor and the pitch and then, secondarily heat-treated at 950° C. for 2 hours and pulverized, and 3 wt % of the pitch was further added to 100 wt % of the mixture of the silicon precursor and the pitch and then, thirdly heat-treated at 950° C. for 2 hours, preparing a negative electrode active material according to Comparative Example 1.

2. Manufacturing of Rechargeable Lithium Battery Cells 97.5 wt % of the negative electrode active material, 1.5 wt % of carboxymethyl cellulose, and 1 wt % of a styrene butadiene rubber were mixed in a water solvent, preparing negative electrode active material layer slurry. The negative electrode active material layer slurry was coated on a copper foil current collector and then, dried and roll-pressed, manufacturing a negative electrode.

98.5 wt % of a $LiNi_{0.8}Co_{0.15}Mn_{0.05}O_2$ positive electrode active material, 1.0 wt % of a polyvinylidene fluoride binder, and 0.5 wt % of a carbon nanotube conductive material were mixed to prepare a positive electrode active material layer slurry, and the positive electrode active material layer slurry was coated on an aluminum foil current collector and then, dried and roll-pressed, manufacturing a positive electrode.

The positive and negative electrodes were, with a polytetrafluoroethylene separator and an electrolyte solution, prepared by dissolving 1 M $LiPF_6$ in a mixed solvent of ethylene carbonate and dimethyl carbonate in a volume ratio of 3:7 in a common method, manufacturing a rechargeable lithium battery cell.

Example 1

After preparing a silicon precursor in the same manner as in Comparative Example 1, 62 wt % of the silicon precursor was mixed with 32 wt % of pitch and then, primarily heat-treated at 950° C. under a nitrogen atmosphere for 2 hours and pulverized, 3 wt % of the pitch was further added thereto and then, secondarily heat-treated at 950° C. for 2 hours and pulverized, and 3 wt % of the pitch was further added thereto and then, thirdly heat-treated at 950° C. for 2 hours and pulverized, preparing a negative electrode active material of Example 1. Other than that, a rechargeable lithium battery cell was manufactured in the same manner as in Comparative Example 1.

Example 2

After preparing a silicon precursor in the same manner as in Comparative Example 1, 59 wt % of the silicon precursor was mixed with 35 wt % of pitch and then, primarily heat-treated at 950° C. under a nitrogen atmosphere for 2 hours and pulverized, 3 wt % of the pitch was further added thereto and then, secondarily heat-treated at 950° C. for 2 hours and pulverized, and 3 wt % of the pitch was further added thereto and then, thirdly heat-treated at 950° C. for 2 hours and pulverized, preparing a negative electrode active material of Example 2. Other than that, a rechargeable lithium battery cell was manufactured in the same manner as in Comparative Example 1.

Comparative Example 2

After preparing a silicon precursor in the same manner as in Comparative Example 1, 55 wt % of the silicon precursor was mixed with 39 wt % of pitch and then, primarily heat-treated at 950° C. under a nitrogen atmosphere for 2 hours and pulverized, 3 wt % of the pitch was further added thereto and then, secondarily heat-treated at 950° C. for 2 hours and pulverized, and 3 wt % of the pitch was further added thereto and then, thirdly heat-treated at 950° C. for 2 hours and pulverized, preparing a negative electrode active material of Comparative Example 2. Other than that, a rechargeable lithium battery cell was manufactured in the same manner as in Comparative Example 1.

Comparative Example 3

After preparing a silicon precursor in the same manner as in Comparative Example 1, 62 wt % of the silicon precursor was mixed with 38 wt % of pitch and then, primarily heat-treated at 950° C. under a nitrogen atmosphere for 2 hours and pulverized, preparing a negative electrode active material of Comparative Example 3. Other than that, a rechargeable lithium battery cell was manufactured in the same manner as in Comparative Example 1.

Analysis of Negative Electrode Active Material

The negative electrode active materials according to Comparative Examples 1 and Examples 1 to 3 were measured with respect to a volume of pores on the particle surface in a BJH method by using ASAP 2460 equipment manufactured made by Micromeritics Instrument Corp., which was used to calculate a volume ratio of the closed pores according to Equation 1, and the results are shown in Table 1.

Figure 3:
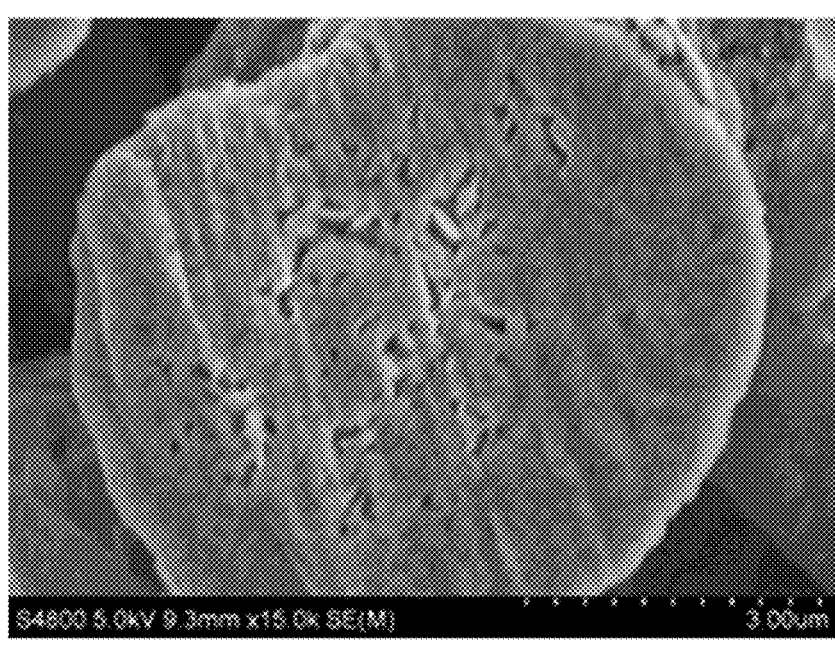
FIG. 3 is a scanning electron micrograph of a cross-section of the silicon-carbon composite particle prepared in Example 1.

In addition, a scanning electron microscope image of a cross-section of the negative electrode active material of Example 1 is shown in FIG. 3. Referring to FIG. 3, the closed pores were formed inside particles.

Evaluation Example 1: Evaluation of Capacity of Negative Electrode Active Material and Evaluation of Initial Charge/Discharge Efficiency of Rechargeable Lithium Battery Cells Each of the rechargeable lithium battery cells of Comparative Examples 1 to 3 and Examples 1 and 2 was charged Before and after the initial charge and discharge, a thickness of each negative electrode was measured to calculate an initial negative electrode expansion rate according to Equation 2, and the results are shown in Table 1. In addition, when each of the cells was repeatedly 50 cycles charged and discharged, a thickness of the negative electrode was measured to calculate a negative electrode expansion rate at the $50^{th}$ cycle according to Equation 3, and the results are shown in Table 1.

$$((\text{thickness of negative electrode after initial charge/discharge}) - (\text{thickness of negative electrode before initial charge/discharge}))/((\text{thickness of negative electrode before initial charge/discharge}) \times 100 \quad \text{[Equation 2]}$$

$$((\text{thickness of negative electrode after 50 cycles}) - (\text{thickness of negative electrode before initial charge/discharge}))/((\text{thickness of negative electrode before initial charge/discharge}) \times 100 \quad \text{[Equation 3]}$$

In addition, a ratio of discharge capacity at the $100^{th}$ cycle to the initial discharge capacity was calculated and provided as capacity retention in Table 1.

TABLE 1

| | Comp. Ex. 1 | Ex. 1 | Ex. 2 | Comp. Ex. 2 | Comp. Ex. 3 |
|---|---|---|---|---|---|
| Pitch mixing ratio (wt %) | 35 | 38 | 41 | 45 | 38 |
| BJH pore volume (cm³/g) | 0.044 | 0.012 | 0.009 | 0.010 | 0.035 |
| closed pores volume (cm³/g) | 0.007 | 0.016 | 0.018 | 0.009 | 0.008 |
| Negative electrode active material capacity (mAh/g) | 1872 | 1748 | 1654 | 1537 | 1755 |
| Initial charge and discharge efficiency (%) | 80.4 | 87.2 | 88.6 | 89.6 | 86.7 |
| Initial negative electrode expansion rate (%) | 18.4 | 20.1 | 21.3 | 24.5 | 19.2 |
| Negative electrode expansion rate (%) after 50 cycles | 38.7 | 26.1 | 25.7 | 24.6 | 30.2 |
| Capacity retention (%) after 100 cycles | 63.0 | 77.1 | 77.7 | 79.6 | 70.1 | to an upper limit voltage of 4.25 V under a constant current of 0.1 C and to 0.05 C under a constant voltage and discharged to a cut-off voltage of 2.5 V at 0.1 C at 25° C. as initial charge and discharge. Through this, initial capacity of each of the negative electrode active materials was calculated, and the results are shown in Table 1, and a ratio of initial discharge capacity to the initial charge capacity was calculated and then, provided as initial charge and discharge efficiency in Table 1.

Evaluation Example 2: Evaluation of Initial Expansion Rate and Expansion Rate During Cycle-Life of Negative Electrode and Cycle-Life Characteristics After the initial charge and discharge of Evaluation Example 1, the cells were charged at 1.0 C and discharged at 1.0 C within a voltage range of 2.5 V to 4.25 V at 25° C., and this cycle was repeated 100 times or more.

Referring to Table 1, Comparative Example 1 had a surface pore volume of greater than 0.02 cm³/g which was measured in BJH and thus exhibited excessive open pores but a closed pore volume of less than 0.015 cm³/g, which confirms that almost no closed pores were formed. Comparative Example 1 turned out to have high capacity of the negative electrode active material due to a high silicon content ratio but significantly low initial charge and discharge efficiency, a high negative electrode expansion rate during the cycles, and significantly low $100^{th}$ cycle capacity retention.

Comparative Example 2 had a closed pore volume of less than 0.015 cm³/g, which means that almost no closed pores were formed, and thus turned out to increase initial charge and discharge efficiency and cycle-life characteristics of a battery but was difficult to be commercially used due to too low capacity realized by the negative electrode and a high initial negative electrode expansion rate.

Comparative Example 3, to which the same amount of pitch as in Example 1 was once added, exhibited a surface pore volume of greater than 0.02 cm³/g, which was measured in BJH, and thus excessive open pores but a closed pore volume of less than 0.015 cm³/g, which means that almost no closed pores were formed. Comparative Example 3 exhibited a high negative electrode expansion rate at the 50$^{th}$ cycle and low capacity retention at the 100$^{th}$ cycle, resulting in deteriorating cycle-life characteristics.

On the contrary, Examples 1 and 2 exhibited a smaller surface pore volume than 0.02 cm³/g and a closed pore volume ranging from 0.015 cm³/g to 0.05 cm³/g, when measured in BJH, which confirmed that a few open pores were formed but the closed pores of an appropriate volume were formed. Accordingly, Examples 1 and 2 realized high negative electrode capacity and exhibited excellent initial charge and discharge efficiency and cycle-life characteristics and in addition, a low initial negative electrode expansion rate and a low negative electrode expansion rate during the cycle-life and thus turned out to be the most suitable for commercial use.

By way of summation and review, a negative electrode active material that minimizes volume expansion during charge and discharge and suppresses deterioration by an electrolyte is provided, thereby providing a rechargeable lithium battery with improved initial charge and discharge efficiency, battery expansion rate, and cycle-life characteristics.

The negative electrode active material including silicon-carbon composite particle according to some example embodiments may have closed pores of a certain volume, thereby minimizing volume expansion due to charging and discharging, minimizing electrolyte permeation, and suppressing deterioration caused by the electrolyte. A rechargeable lithium battery to which this is applied may have improved electrochemical characteristics such as capacity characteristics, initial charge/discharge efficiency, battery expansion rate, and cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode active material, comprising:
a silicon-carbon composite particle including a plurality of silicon nanoparticles and amorphous carbon;
wherein:
the plurality of silicon nanoparticles are included in an amount of about 56 wt % to about 64 wt % and the amorphous carbon is included in an amount of about 36 wt % to about 44 wt % based on a total weight of the silicon-carbon composite particle;
the silicon-carbon composite particle includes closed pores therein;
a pore volume of a surface of the silicon-carbon composite particle measured by a BJH method is less than about 0.02 cm³/g; and a volume of the closed pores of the silicon-carbon composite particle calculated by Equation 1 is about 0.015 cm³/g to about 0.05 cm³/g:

$$\text{Volume of closed pores in a particle} = \qquad [\text{Equation 1}]$$
$$\left((\text{theoretical density}) - (\text{true density})\right)^{-1} -$$
$$(\text{pore volume measured by the } BJH \text{ method}).$$

2. The negative electrode active material as claimed in claim 1, wherein the volume of closed pores of the silicon-carbon composite particle calculated by Equation 1 is about 0.015 cm³/g to about 0.025 cm³/g.

3. The negative electrode active material as claimed in claim 1, wherein the pore volume of the surface of the silicon-carbon composite particle measured by the BJH method is about 0.001 cm³/g to about 0.018 cm³/g.

4. The negative electrode active material as claimed in claim 1, wherein an average particle diameter ($D_{50}$) of the silicon-carbon composite particle is about 3 μm to about 25 μm.

5. The negative electrode active material as claimed in claim 1, wherein the plurality silicon nanoparticles are included in an amount of about 58 wt % to about 63 wt % and the amorphous carbon is included in an amount of about 37 wt % to about 42 wt % based on a total weight of the silicon-carbon composite particle.

6. The negative electrode active material as claimed in claim 1, wherein the silicon-carbon composite particle includes an amorphous carbon matrix and the plurality of silicon nanoparticles are embedded in the amorphous carbon matrix.

7. The negative electrode active material as claimed in claim 1, wherein the silicon-carbon composite particle includes the amorphous carbon surrounding the surface of the plurality of silicon nanoparticles.

8. The negative electrode active material as claimed in claim 1, wherein an average particle diameter ($D_{50}$) of the plurality of silicon nanoparticles is about 10 nm to about 200 nm and a maximum particle diameter ($D_{max}$) is less than or equal to about 300 nm.

9. The negative electrode active material as claimed in claim 1, wherein the plurality of silicon nanoparticles have a full width at half maximum (FWHM) of a (111) plane peak measured by X-ray diffraction method of about 0.5 to about 7.

10. The negative electrode active material as claimed in claim 9, wherein a ratio of a length of a major axis in a plane direction to a thickness of each of the flake-shaped silicon nanoparticles is about 5 to about 20.

11. The negative electrode active material as claimed in claim 1, wherein each of the plurality of silicon nanoparticles has a flake-shape.

12. The negative electrode active material as claimed in claim 1, wherein the amorphous carbon includes a pitch or pitch carbonized product.

13. A method for preparing a negative electrode active material, the method comprising:
preparing a silicon precursor by spray-drying a slurry in which a plurality of silicon nanoparticles are dispersed in a solvent;
first mixing pitch with the silicon precursor and performing first heat-treatment;
second mixing pitch with an obtained product and performing second heat-treatment; and third mixing pitch with an obtained product and performing third heat-treatment to obtain the negative electrode active material of claim 1, the silicon precursor being mixed in an amount of about 56 wt % to about 64 wt % and the pitch being mixed in an amount of about 36 wt % to about 44 wt % based on a total weight of the silicon precursor and pitch.

14. The method as claimed in claim 13, wherein:

in the first mixing and heat-treatment, the pitch is mixed in an amount of about 30 wt % to about 38 wt % based on a total weight of the silicon precursor and pitch, in the second mixing and heat-treatment, the pitch is mixed in an amount of about 1 wt % to about 10 wt % based on a total weight of the silicon precursor and pitch, and in the third mixing and heat-treatment, the pitch is mixed in an amount of about 1 wt % to about 10 wt % based on a total weight of the silicon precursor and pitch.

15. The method as claimed in claim 13, wherein in the first to third mixing and heat-treatment, heat-treatment temperature is each about 800° C. to about 1100° C.

16. The method as claimed in claim 13, wherein the method further includes a fourth or higher mixing and heat-treatment process after the third mixing and heat-treatment.

17. The method as claimed in claim 16, wherein in the fourth or higher mixing and heat-treatment processes, the pitch is mixed in an amount of about 1 wt % to about 10 wt % based on a total weight of the silicon precursor and pitch and a heat-treatment temperature is about 800° C. to about 1100° C.

18. The method as claimed in claim 13, wherein the method further includes pulverizing after the first mixing and heat-treatment, the second mixing and heat-treatment, or the third or higher mixing and heat-treatment.

19. A rechargeable lithium battery, comprising:

a negative electrode including the negative electrode active material as claimed in claim 1;

a positive electrode; and an electrolyte.

\* \* \* \* \*